(12) United States Patent
Brunsman et al.

(10) Patent No.: US 10,412,230 B2
(45) Date of Patent: Sep. 10, 2019

(54) SYSTEM AND METHOD FOR RETAIL SIM MARKETPLACE

(71) Applicant: Google LLC, Mountain View, CA (US)

(72) Inventors: Lawrence Jonathan Brunsman, Mountain View, CA (US); Paul Manwell, San Francisco, CA (US); Arvind Jain, Los Altos, CA (US); Nicholas Charles Fox, San Francisco, CA (US); Kerrie Lenhart Hogan, Oakland, CA (US); Adrian Hurditch, Mountain View, CA (US); Matthew Klainer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/330,843

(22) Filed: Jul. 14, 2014

(65) Prior Publication Data

US 2016/0014280 A1 Jan. 14, 2016

(51) Int. Cl.
*H04M 15/00* (2006.01)
*G06Q 20/16* (2012.01)
(Continued)

(52) U.S. Cl.
CPC .......... *H04M 15/774* (2013.01); *G06Q 20/16* (2013.01); *H04L 63/0272* (2013.01);
(Continued)

(58) Field of Classification Search
CPC .. H04M 15/774; H04M 15/715; G06Q 20/16; H04W 8/18; H04W 4/60; H04W 12/0023;
(Continued)

(56) References Cited

U.S. PATENT DOCUMENTS 6,128,490 A 10/2000 Shaheen et al.
6,381,315 B1 4/2002 Nhaissi
(Continued)

FOREIGN PATENT DOCUMENTS

EP 1885144 A2 2/2008
EP 2244501 A1 10/2010
(Continued)

OTHER PUBLICATIONS

Korean Intellectual Property Office, International Search Report and the Written Opinion in International Application No. PCT/US2014/057709 dated Dec. 29, 2014.
(Continued)

*Primary Examiner* — Mehmood B. Khan
(74) *Attorney, Agent, or Firm* — Honigman LLP (57) ABSTRACT

A system and method for accessing a carrier network by a client device. The method includes: receiving a selection of a first plan from a carrier marketplace that includes at least the first plan and a second plan, wherein the first plan corresponds to a first set of services provided by a first carrier network, and the second plan corresponds to a second set of services provided by a second carrier network; downloading a carrier profile from the server device to a multi-profile UICC (Universal Integrated Circuit Card) included in the client device, wherein the carrier profile is associated with the first plan; and storing the carrier profile in the multi-profile UICC.

20 Claims, 7 Drawing Sheets

(51) Int. Cl.
| | |
|---|---|
| *H04W 8/18* | (2009.01) |
| *H04L 29/06* | (2006.01) |
| *H04W 12/04* | (2009.01) |
| *H04W 4/50* | (2018.01) |
| *H04W 4/60* | (2018.01) |
| *H04W 12/00* | (2009.01) |
| *H04W 8/20* | (2009.01) |

(52) U.S. Cl.
CPC ........... *H04M 15/715* (2013.01); *H04W 4/50* (2018.02); *H04W 4/60* (2018.02); *H04W 8/18* (2013.01); *H04W 12/0023* (2019.01); *H04W 12/04* (2013.01); *H04W 8/20* (2013.01); *H04W 12/00405* (2019.01)

(58) Field of Classification Search
CPC ......... H04W 12/04; H04W 4/50; H04W 8/20; H04W 12/00405; H04L 63/0272
USPC ........................................ 726/7; 705/34, 335
See application file for complete search history.

(56) References Cited

U.S. PATENT DOCUMENTS

| | | | |
|---|---|---|---|
| 6,633,761 | B1 | 10/2003 | Singhal et al. |
| 7,180,898 | B2 | 2/2007 | Yoshida et al. |
| 7,240,095 | B1* | 7/2007 | Lewis .................. G06Q 10/107 379/93.01 |
| 7,266,369 | B2* | 9/2007 | Moles ............... H04M 3/42178 455/414.1 |
| 7,433,929 | B2 | 10/2008 | Guilford et al. |
| 7,509,131 | B2 | 3/2009 | Krumm et al. |
| 7,809,360 | B2 | 10/2010 | Agrawal et al. |
| 7,848,292 | B2 | 12/2010 | Bl et al. |
| 8,131,317 | B2 | 3/2012 | Lee |
| 8,155,081 | B1 | 4/2012 | Mater et al. |
| 8,165,581 | B2 | 4/2012 | Joshi et al. |
| 8,200,217 | B2 | 6/2012 | Kanade et al. |
| 8,301,513 | B1* | 10/2012 | Peng ..................... G06Q 30/00 705/26.1 |
| 8,391,192 | B2 | 5/2013 | Prakash et al. |
| 8,477,645 | B2 | 7/2013 | Scherzer et al. |
| 8,484,568 | B2 | 7/2013 | Rados et al. |
| 8,542,637 | B2 | 9/2013 | Bandhakavi et al. |
| 8,565,766 | B2 | 10/2013 | Scherzer et al. |
| 8,590,023 | B2 | 11/2013 | Gupta et al. |
| 8,788,593 | B1* | 7/2014 | Tong .................... G06Q 10/107 370/338 |
| 9,258,679 | B1* | 2/2016 | Williams .............. H04W 4/028 |
| 2002/0169716 | A1 | 11/2002 | Johnson et al. |
| 2003/0078019 | A1* | 4/2003 | Dorenbsoch .......... H04W 48/18 455/154.1 |
| 2004/0246920 | A1 | 12/2004 | Savolainen |
| 2005/0245269 | A1 | 11/2005 | Demirhan et al. |
| 2006/0098625 | A1 | 5/2006 | King et al. |
| 2006/0193295 | A1 | 8/2006 | White et al. |
| 2007/0037550 | A1 | 2/2007 | Rassam |
| 2007/0064684 | A1 | 3/2007 | Kottilingal |
| 2007/0064894 | A1 | 3/2007 | Armstrong et al. |
| 2007/0127391 | A1 | 6/2007 | Goodman |
| 2007/0147317 | A1 | 6/2007 | Smith et al. |
| 2008/0002668 | A1 | 1/2008 | Asokan et al. |
| 2008/0009279 | A1 | 1/2008 | Sakawa |
| 2008/0107051 | A1 | 5/2008 | Chen et al. |
| 2008/0233977 | A1 | 9/2008 | Xu et al. |
| 2009/0061862 | A1 | 3/2009 | Alberth, Jr. et al. |
| 2009/0168757 | A1 | 7/2009 | Bush |
| 2009/0298467 | A1 | 12/2009 | Zohar |
| 2010/0172323 | A1 | 7/2010 | Rexhepi et al. |
| 2010/0304737 | A1 | 12/2010 | Jain et al. |
| 2011/0096673 | A1 | 4/2011 | Stevenson et al. |
| 2011/0216694 | A1 | 9/2011 | Plasberg et al. |
| 2011/0238545 | A1* | 9/2011 | Fanaian ................. G06Q 30/02 705/34 |
| 2011/0269423 | A1 | 11/2011 | Schell et al. |
| 2011/0306318 | A1* | 12/2011 | Rodgers ................ H04W 8/183 455/410 |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0108206 | A1* | 5/2012 | Haggerty .............. H04W 8/183 455/411 |
| 2012/0178488 | A1 | 7/2012 | Jonker et al. |
| 2012/0195223 | A1 | 8/2012 | Raleigh |
| 2012/0282915 | A1 | 11/2012 | Haynes et al. |
| 2013/0040693 | A1 | 2/2013 | Chen et al. |
| 2013/0060653 | A1* | 3/2013 | Sharkey ............... H04L 69/321 705/26.3 |
| 2013/0148567 | A1 | 6/2013 | Efrati et al. |
| 2013/0155842 | A1 | 6/2013 | Moore et al. |
| 2013/0165117 | A1 | 6/2013 | Narayanan |
| 2013/0203438 | A1 | 8/2013 | Shin |
| 2013/0225169 | A1 | 8/2013 | Farnsworth et al. |
| 2013/0227647 | A1 | 8/2013 | Thomas et al. |
| 2013/0230023 | A1 | 9/2013 | Gray et al. |
| 2013/0303156 | A1 | 11/2013 | Astrom et al. |
| 2014/0071895 | A1 | 3/2014 | Bane et al. |
| 2014/0080539 | A1 | 3/2014 | Scherzer et al. |
| 2014/0086177 | A1* | 3/2014 | Adjakple .............. H04W 12/08 370/329 |
| 2014/0127992 | A1 | 5/2014 | Kuscher et al. |
| 2014/0148100 | A1 | 5/2014 | Kim et al. |
| 2014/0148170 | A1 | 5/2014 | Damji et al. |
| 2014/0211648 | A1 | 7/2014 | Rahmati et al. |
| 2014/0213256 | A1 | 7/2014 | Meylan et al. |
| 2015/0098393 | A1 | 4/2015 | Tofighbakhsh et al. |
| 2015/0127939 | A1 | 5/2015 | Mazandarany et al. |
| 2015/0141037 | A1 | 5/2015 | Saha et al. |
| 2015/0281198 | A1* | 10/2015 | Lee ......................... H04L 63/08 726/7 |
| 2016/0037340 | A1 | 2/2016 | Rayment et al. |
| 2016/0261596 | A1 | 9/2016 | Khello et al. |

FOREIGN PATENT DOCUMENTS

| | | |
|---|---|---|
| WO | 2002-041580 A1 | 5/2002 |
| WO | 2004-047476 A1 | 6/2004 |
| WO | 2006-005947 A1 | 1/2006 |
| WO | 2008/060464 A2 | 5/2008 |
| WO | 2011-162688 A1 | 12/2011 |
| WO | WO 2013/020598 A1 | 2/2013 |
| WO | WO 2013/044359 A1 | 4/2013 |
| WO | 2014-011094 A1 | 1/2014 |
| WO | 2015/158263 A1 | 10/2015 |

OTHER PUBLICATIONS

Gemalto N.V. "Card ADMIN," Document Reference D1225357A (Jun. 2, 2011).
Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).
DICODA.com. "Multi IMSI," Dicoda.com (Jun. 20, 2013) (available at: https://web.archive.org/web/20130620191315/http://www.dicoda.com/introduction/imsi).
Tobias, Marc Weber. "The Split Personality Cell Phone That Saves You Money on Overseas Calling," Forbes.com (Aug. 20, 2013) (available at: http://onforb.es/14gMCe4).
CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).
Ge et al., "A History-Based Handover Prediction for LTE Systems" Computer Network and Multimedia Technology. CNMT. International Symposium on , vol., No., pp. 1,4, 18-20 (Jan. 2009).
"Circuit-switched fallback. The first phase of voice evolution for mobile LTE devices." Qualcomm Incorporated, 2012 11 pages.
"Feature Requests—Republic Wireless Wiki," http://republic-wireless.wikia.com/wiki/Feature_Requests 1 page.

(56) References Cited

OTHER PUBLICATIONS

"Republic Wireless," http://republicwireless.com 2 pages.
"T-Mobile's 4G Network—Check Your Coverage—T-Mobile Blazing Fast 4G Coverage" 9 pages.
"What is VoLTE | Voice Over LTE | Tutorial," Radio-Electronics.com, http://www.radio-electronics.com/info/cellulartelecomms/lte-long-term-evolution/voice-over-lte-volte.php 5 pages.
Bircher et al., "An Agent-Based Architecture for Service Discovery and Negotiation in Wireless Networks," University of Bern, Wired/Wireless Internet Comms. (WWIC), Jan. 21, 2004.
Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.
VoLGA Forum, "VoLGA Stage 2 V1.7.0: Voice over LTE via Generic Access," Jun. 14, 2010.
Qualcomm Europe et al., "Text Proposal for UE Measurements for Minimizing Drive Tests," 3GPP TSG-RAN WG2 Meeting #66, R2-093175, May 4-8, 2009.
Qualcomm Europe, "Framework for UE SON Reports," 3GPP TSG RAN WG3 & SA WG5, S5-090017, Jan. 12-13, 2008.
CMCC, "Network Selection for WLAN/3GPP Radio Interworking," 3GPP TSG-RAN WG2 Meeting 81#bis, R2-130973, Apr. 15-19, 2013.
Levy, Marlyn, "Best-Practice Authentication Methods for Wi-Fi Offload," http://www.acurixnetworks.com/single-post/2013/05/20/BestPractice-Authentication-Methods-For-WiFi-Offload, May 20, 2013.
Nikravesh et al., "Mobile Network Performance from User Devices: A Longitudinal, Multidimensional Analysis," Passive and Active Measurement: 15th International Conference, PAM 2014, Mar. 10-11, 2014.
Ericsson: "AN-ANDSF Interwar", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.
Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.

\* cited by examiner

SYSTEM AND METHOD FOR RETAIL SIM MARKETPLACE

BACKGROUND

Mobile devices that connect to wireless communication subscriber networks typically are identified to the network prior to being granted authorization to access network services. One method of providing the identification is through the use of a Subscriber Identity Module (SIM) card. A typical SIM card contains a memory device and associated circuitry such that the memory device of the SIM card can be read by the mobile device. Typically, the SIM card contains a unique serial number such as an Integrated Circuit Card Identifier (ICCID), an International Mobile Subscriber Identity (IMSI), security authentication and ciphering information, temporary information related to any local network, a list of the services to which the mobile device has access, user contact information, and two passwords: a personal identification number (PIN) for ordinary use and a Personal Unblocking Code (PUK) for PIN unlocking.

During operation, a mobile device utilizes the SIM card to access the subscriber network. In doing so, the mobile device accesses the SIM card to obtain the information stored thereon required to utilize services from the subscriber network. In order to access the stored content, the mobile device typically has the SIM card inserted into a physical holder located within the mobile device. Accordingly, the mobile device is typically designed with an external slot or SIM card holder capable of receiving the SIM card. Further, the mobile device typically is designed with the attendant circuitry to read the stored contents from the SIM card.

In conventional systems, the SIM card provides the mobile device access to a single carrier network. To overcome this limitation, some mobile devices provide the ability to insert two SIM cards into the mobile device so as to be able to access two different carrier networks corresponding to the two SIM cards. However, this solution has the drawback of requiring two SIM cards as well as specialized hardware (i.e., a specialized mobile device) capable of accepting multiple SIM cards.

SUMMARY

One embodiment provides a method for accessing a carrier network by a client device. The method includes: receiving a selection of a first plan from a carrier marketplace that includes at least the first plan and a second plan, wherein the first plan corresponds to a first set of services provided by a first carrier network, and the second plan corresponds to a second set of services provided by a second carrier network; downloading a carrier profile from the server device to a multi-profile UICC (Universal Integrated Circuit Card) included in the client device, wherein the carrier profile is associated with the first plan; and storing the carrier profile in the multi-profile UICC.

Another embodiment provides a computer-readable storage medium storing instructions that, when executed by a processor, cause a client device to access a carrier network, by performing the steps of: receiving a selection of a first plan from a carrier marketplace that includes at least the first plan and a second plan, wherein the first plan corresponds to a first set of services and the second plan corresponds to a second set of services; transmitting a signal associated with the first plan to a server device; downloading a carrier profile from the server device to a multi-profile UICC (Universal Integrated Circuit Card) included in the client device, wherein the carrier profile is associated with the first plan; and storing the carrier profile in the multi-profile UICC.

Another embodiment provides a system for accessing a carrier network. The system includes a client device and a server device. The server device is configured to: cause a listing of available carrier network plans to be displayed in a carrier marketplace, wherein a first plan in the carrier marketplace corresponds to a first set of services provided by a first carrier network, and a second plan in the carrier marketplace corresponds to a second set of services provided by a second carrier network, receive a selection of the first plan, provision a carrier profile for the client device associated with the first plan, and transmit a signal to the client device to add the carrier profile to a multi-profile UICC (Universal Integrated Circuit Card) included in the client device.

Other aspects, objectives and advantages of the disclosure will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present disclosure and, together with the description, serve to explain the principles of the disclosure.

DETAILED DESCRIPTION

As described above, in conventional systems where the SIM card in a mobile device is associated with a single carrier network, the mobile device has limited options regarding access to the services of the various carrier networks. For example, when a user and the user's mobile device travel internationally, the mobile device could continue to use the mobile device's current carrier plan that is associated with the SIM card of the mobile device. However, the user of the mobile device may not have any understanding of the cost of roaming data, phone, or messaging use, which could be very expensive.

Another option in conventional systems when the user travels internationally is for the user to purchase a pre-paid SIM card in the country the user is visiting. However, this solution has the added inconvenience of having to purchase a new SIM card in each country that the user visits and install the new SIM card.

Embodiments of the disclosure provide a new way for users to gain access to other carrier networks and/or service other plans without any of the hassles described above in conventional approaches.

Embodiments of the disclosure provide for a multi-profile UICC (Universal Integrated Circuit Card). The multi-profile UICC is a SIM card for mobile devices that can multiple store carrier profiles from one or more carriers. The multi-profile UICC can therefore be used to grant access to multiple carrier networks without needing multiple physical SIM cards. Examples of carrier networks include T-Mobile®, Sprint, etc. The mobile device is configured to access one of the carrier profiles stored on the multi-profile SIM card, referred to as the "active carrier profile," which identifies the carrier network that can be accessed by the mobile device. The mobile device is also configured to add or remove carrier profiles from the SIM card and switch between the carrier profiles to access different carrier networks and/or different carrier plans.

Some embodiments provide a marketplace for carrier networks to provide access to the services of different carrier networks using a multi-profile UICC. In an example use case, a mobile device has a multi-profile UICC installed therein. A user of the mobile device then travels internationally with the mobile device. Instead of purchasing a replacement SIM card, the user accesses an online marketplace that displays available carrier network offers. For example, the marketplace might show a first option for unlimited talk, text, and data from Carrier 1 for $50 and a second option for unlimited talk, text, with 1 GB of data for $40 from Carrier 2. In another example, both options can be offered by the same carrier.

Continuing with the example, the user may select either the first or second option, and pay for the plan using any technically feasible method. In one implementation, the user can pay for the new carrier plan on the user's current monthly bill, e.g., with the user's primary cell phone provider, or through a third-party. The amount owed can be relayed to the new carrier by the user's primary cell phone provider or the third-party at a later time. In other words, the user continues to pay just one bill, and payment is remitted behind-the-scenes to the carriers used. Once an option is selected by the user in the marketplace, a server then causes a new carrier profile to be installed or activated on the multi-profile UICC in the user's mobile device, which provisions the mobile device with new credentials corresponding to the selected option and carrier network. In some embodiments, the provisioning step is done wirelessly, i.e., "over the air," without the user needing to remove the SIM card from the mobile device. The user can then start using the mobile phone as if the user had purchased a pre-paid SIM for the selected network.

Also, in some embodiments, two or more of the available plans could be offered by the same carrier. For example, if a user travelled to a region where only one carrier provides service (or one carrier offers service through the marketplace), then the user might be provided with only a single plan or with multiple plans from a single carrier.

Advantageously, embodiments of the disclosure improve access to different carrier networks and plans on a mobile device. International travelers gain the benefit of competition in the marketplace without any trouble of purchasing new SIM cards. In addition, embodiments of the disclosure increase competition in the wireless marketplace, especially for international travelers.

Figure 1:
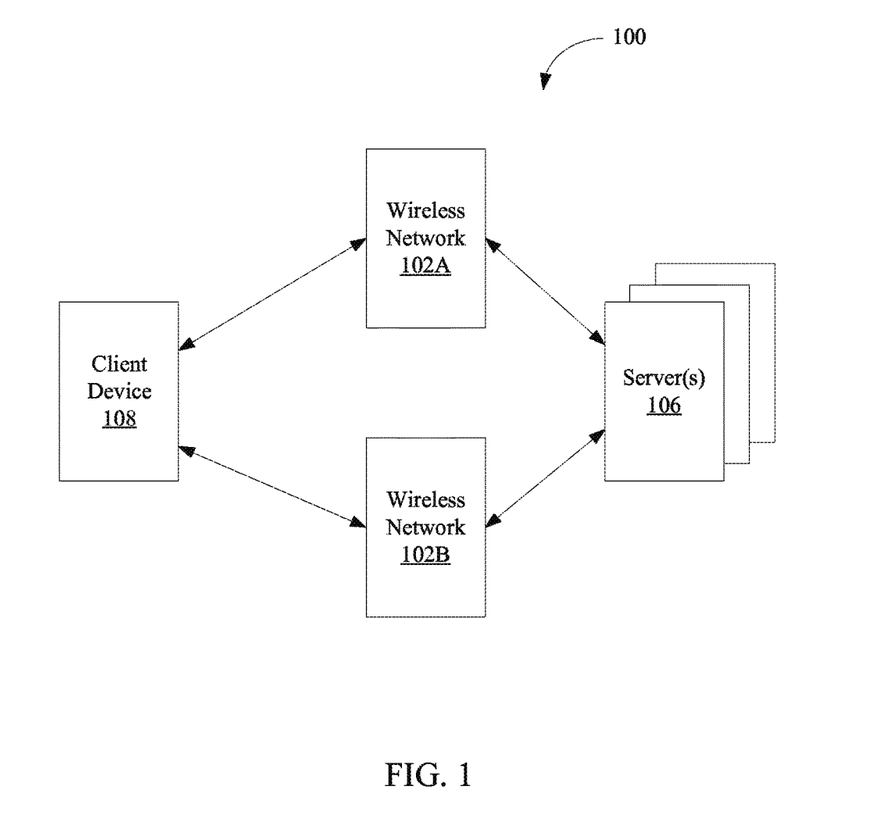
FIG. 1 is a block diagram of an example communications system in which various embodiments of the present disclosure may be implemented.

FIG. 1 is a block diagram of an example communications system 100 in which various embodiments of the present disclosure may be implemented. The communications system 100 includes a client device 108, wireless networks 102A-102B, and server(s) 106.

The client device 108 may be a mobile device such as a smart phone, a tablet computer, a laptop computer, a watch with a computer operating system, a personal digital assistant (PDA), a video game console, a wearable or embedded digital device(s), or any one of a number of additional devices capable of communicating over a plurality of wireless networks. Although only one client device is shown in FIG. 1, multiple client devices are within the scope of the disclosure.

The wireless networks 102A-102B provide services to the client device 108, such as voice, text, and data services. The wireless networks 102A-102B may provide data service (i.e., "Internet" service), cellular phone service, text messaging service, SMS (Short Message service), and/or any other services. For example, mobile device 102 may transmit information to the wireless networks 102A-102B and receive information from the wireless networks 102A-102B. The wireless networks 102A-102B may include a set of cell towers, as well as a set of base stations and/or mobile switching centers (MSCs).

In one embodiment, each wireless network 102A, 102B is associated with a different cellular carrier network. In some embodiments, the client device 108 can connect to the wireless network via a multi-profile SIM card on the client device 108 that securely stores the international mobile subscriber identity (IMSI) and related key used to identify and authenticate the subscriber of the client device 108. Although only two wireless networks are shown in FIG. 1, multiple additional wireless networks are within the scope of the disclosure.

The wireless networks 102A-102B include but are not limited to Wide Area Networks (WAN) such as a Long Term Evolution (LTE) network, a Global System for Mobile Communications (GSM) network, a Code Division Multiple Access (CDMA) network, a Wideband Code Division Multiple Access (WCDMA) network, Wireless Local Area Networks (WLAN) such as the various Wi-Fi networks operating under the various IEEE 802.11 standards, or any other kind of wireless network.

As an aside, whether because of technological limitations or geographic limitations, not every client device of the plurality of client devices will be able to connect to each of the plurality of wireless networks. For ease of description, embodiments of the disclosure described herein will refer to the client devices 108 communicating with a plurality of wireless networks 102A, 102B, even though it is understood that not every client device will communicate with every wireless network.

The communications system 100 also includes server 106. Although server 106 is illustrated as a single server, the server 106 could be implemented as a plurality of servers servicing specified geographic locations. Server 106 could also be implemented as a cloud server. A singular server 106 is illustrated for ease of description. This singular server illustration is not intended to limit the disclosure contained herein.

As the discussion of the various devices, systems and methods contained herein progresses, at points only a singular client device 108 or a singular wireless network may be discussed. In this regard, client device 108 or wireless networks 102A-102B are only referenced as being generally representative of a plurality of client devices and a plurality of wireless networks, respectively. Therefore, the functionality of client device 108 can be imported to the plurality of client devices, and the functionality of wireless networks 102A-102B can be imported to the plurality of wireless networks.

Additionally, in certain embodiments, the client device 108 may collect location data that indicates a location of the client device 108. In certain embodiments, the location data includes a latitude, a longitude, and a timestamp of when the location data is determined. Generally, the latitude and longitude are collected to a certain precision that allows the location of client device 108 to be determined to within 5-100 meters. In doing so, the latitude and longitude data will be coarsened to the sixth decimal digit. One such technique to coarsen the longitude and latitude data is to multiply a raw latitude or longitude measurement by 1,000,000 and truncate any places in the resulting number beyond six digits after the decimal. If collected, the location data may be used to provide access to one or more available plans offered by one or more carrier networks.

As an aside, the location data will only be collected if a user of the client device 108 has indicated that location data may be collected from the client device 108. In this regard, if the user configures the client device 108 such that location data is not to be collected, then location data for the client device 108 will not be collected.

In some embodiments, the listing of available plans offered by one or more carrier networks can be determined based on which networks are "visible" to the client device, i.e., as a result of a scan performed by the client device. For example, if the user travels to a certain region (e.g., a foreign country), then the marketplace offers that are relevant to the user are limited to only those for carriers that are visible and usable by the user's client device in the region. In these embodiments, the list can be determined by scanning for available cellular networks, and not by using a location-based database. As such, some embodiments provide the ability to filter offers based on what carrier networks are visible to the device as a result of a network scan.

Figure 2:
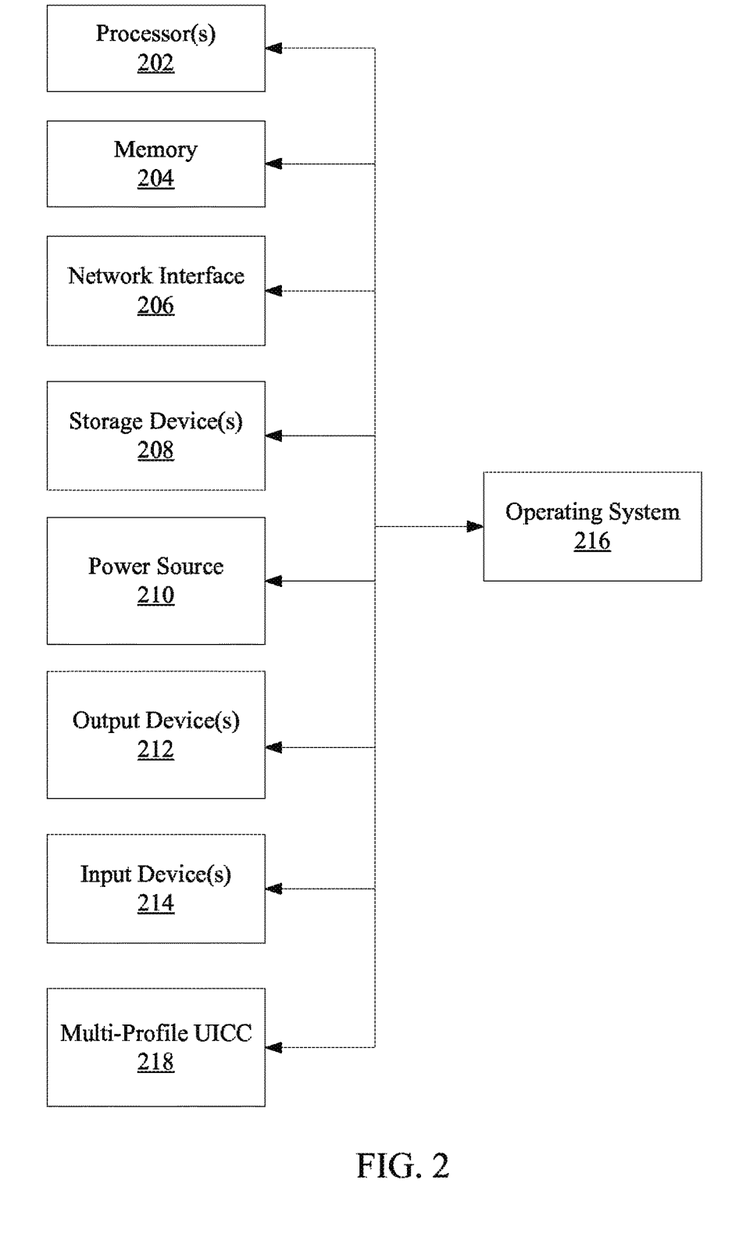
FIG. 2 is a conceptual diagram illustrating an example client device, according to embodiments of the disclosure.

FIG. 2 is a conceptual diagram illustrating an example client device 108, according to embodiments of the disclosure. In one example, client device 108 shown in FIG. 2 is the same as client device 108 shown in FIG. 1. According to various embodiments, many other embodiments of the client device 108 may be used. In the illustrated embodiment of FIG. 2, the client device 108 includes one or more processors 202, memory 204, a network interface 206, one or more storage devices 208, power source 210, one or more output devices 212, one or more input devices 214, and a multi-profile UICC 218. The client device 108 also includes an operating system 216. Each of the components including the processor 202, memory 204, network interface 206, storage device 208, power source 210, output device 212, input device 214, the multi-profile UICC 218, and the operating system 216 is interconnected physically, communicatively, and/or operatively for inter-component communications. In some embodiments, the operating system 216 is stored in the storage device(s) 208 and/or memory 204. In FIG. 2, the operating system 216 is shown outside of the storage device(s) 208 and memory 204 for ease of description.

As illustrated, processor 202 is configured to implement functionality and/or process instructions for execution within client device 108. For example, processor 202 executes instructions stored in memory 204 or instructions stored on a storage device 208. Memory 204, which may be a non-transient, computer-readable storage medium, is configured to store information within client device 108 during operation. In some embodiments, memory 204 includes a temporary memory, an area for information not to be maintained when the client device 108 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some examples, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 108 uses network interface 206 to communicate with external devices via one or more networks, such as wireless networks 102A-102B in FIG. 1, and other types of networks through which a communication with the client device 108 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and USB.

The client device 108 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone, or any other type of input device. In some examples, a presence-sensitive screen includes a touch-sensitive screen.

One or more output devices 212 are also included in client device 108. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 108 includes one or more power sources 210 to provide power to the client device 108. Non-limiting examples of power source 210 include single-use power sources, rechargeable power sources, and/or power sources developed from nickel-cadmium, lithium-ion, or other suitable material.

The client device 108 includes an operating system 216. The operating system 216 controls operations of the components of the client device 108. For example, the operating system 216 facilitates the interaction of the processor(s) 202, memory 204, network interface 206, storage device(s) 208, input device 214, output device 212, and power source 210.

As described in greater detail herein, the client device 108 also includes a multi-profile UICC (Universal Integrated Circuit Card) 218. The UICC 218 includes a SIM circuit that is configured to have stored thereon multiple carrier profiles. Each carrier profile includes the necessary data to allow the client device 108 to access a different carrier network. The client device 108 may also include software (as a standalone application or as part of the operating system 216) that allows the mobile device 108 to switch which carrier profile of the multiple profiles is the active carrier profile that is currently being used by the mobile device 108 to access a carrier network. For example, the user may choose to use the application to switch to a different active carrier profile when the user travels internationally with the client device 108 or travels outside of the coverage area of the previously current active carrier profile.

According to various embodiments, the client device 108 may include other elements not shown in FIG. 2, such as a GPS (Global Positioning System) transceiver, an accelerometer, a compass, a light, among other elements.

Figure 3:
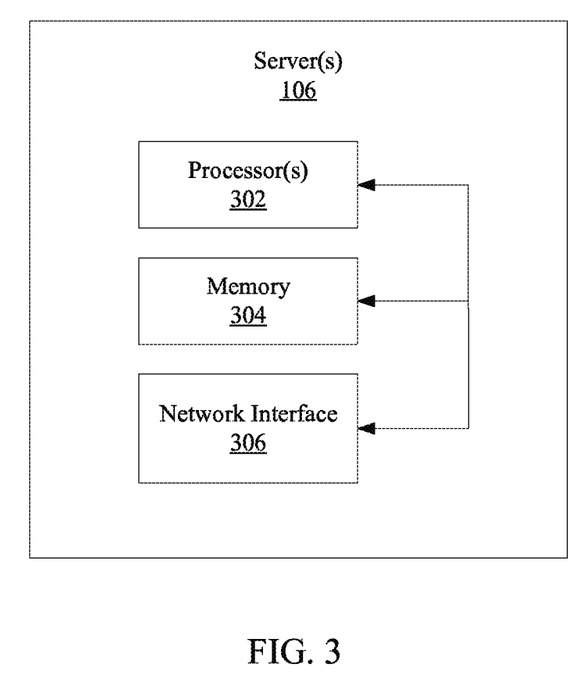
FIG. 3 is a block diagram of basic functional components for a server or cluster of servers 106, according to embodiments of the disclosure.

FIG. 3 is a block diagram of basic functional components for a server or cluster of servers 106, according to embodiments of the disclosure. In some embodiments, server 106 is configured to be the computer or computers operated by one or more carrier networks to provision and implement the disclosed techniques involving a multi-profile UICC. In other embodiments, the server 106 may be operated by a third-party other than the carrier networks to provision and implement the disclosed techniques involving a multi-profile UICC.

The server 106 includes one or more processors 302, memory 304, and network interface 306. In some embodiments, each of the components including the processor(s) 302, memory 304, and network interface 306 is interconnected physically, communicatively, and/or operatively for inter-component communications.

As illustrated, processors 302 are configured to implement functionality and/or process instructions for execution within server 106. For example, processors 302 execute instructions stored in memory 304. Memory 304, which may be a non-transient, computer-readable storage medium, is configured to store information within server 106 during operation. In some embodiments, memory 304 includes a temporary memory, i.e., an area for information not to be maintained when the server 106 is turned off. Examples of such temporary memory include volatile memories such as random access memories (RAM), dynamic random access memories (DRAM), and static random access memories (SRAM). Memory 304 also maintains program instructions for execution by the processors 302.

The server 106 uses network interface 306 to communicate with external devices via one or more networks, such as the wireless networks 102A-102B of FIG. 1. Such networks may include one or more cellular networks, wireless networks, wired networks, fiber optics networks, and other types of networks through which communication between the server 106 and an external device may be established. Network interface 306 may be a network interface card, such as an Ethernet card, an optical transceiver, a radio frequency transceiver, or any other type of device that can send and receive information.

As mentioned above, the server 106 is configured to interact with the wireless networks 102A-102B of FIG. 1 to provision and implement the multi-profile UICC systems and methods disclosed herein. According to certain embodiments, the server 106 is configured to provide a marketplace for wireless carriers to sell their services via service plans. Each plan that is provided by the different wireless carriers may include a certain amount of talk time, number of text messages, and amount of data transfers for a certain price for a certain time frame (e.g., price per month, price per week, etc.). A user can access the marketplace online, by phone, by email or by any other technically feasible technique. In some embodiments, the marketplace can be a physical marketplace, such as a store or a kiosk in a shopping mall.

A user who desires to add a plan for a certain carrier network to their mobile device can access the marketplace provided by the server 106 and select the desired plan. The server 106 then provisions a carrier profile for the user to be added to the user's mobile device. The carrier profile includes a set of data that provides the necessary information for the user's mobile device to access the carrier network associated with the plan. The server then sends a signal to the mobile device to add or activate the carrier profile on a multi-profile UICC included in the mobile device. In one embodiment, the signal from the server to the client device is in the form of an email to an account associated with the user that provides a link to download the carrier profile. Alternatively, data for the carrier profile can be sent directly the mobile device, e.g., via Wi-Fi or via NFC (near field communication). In yet another embodiment, the carrier profile for the given carrier network may already be saved on the multi-profile UICC, but may be inactive or deactivated. The signal sent by the server 106 may be an activation signal to activate the carrier profile for the given wireless carrier.

Figure 4:
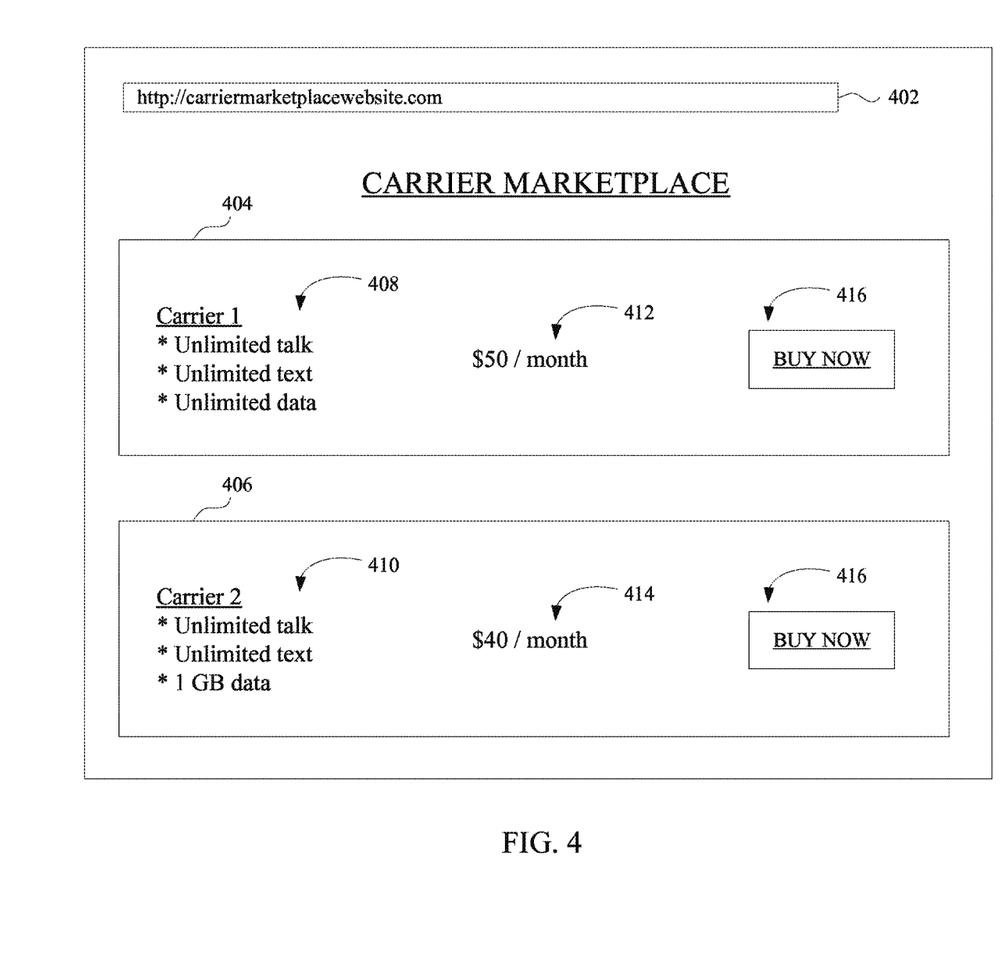
FIG. 4 is a screenshot of a carrier marketplace, according to one embodiment of the disclosure.

FIG. 4 is a screenshot of a carrier marketplace, according to one embodiment of the disclosure. As shown, the carrier marketplace in FIG. 4 is a web-based marketplace. A user can access a web address 402 to enter the marketplace. According to various embodiments, the marketplace can be accessed via the mobile device that would gain access to the network of a given wireless carrier if a plan is purchased. In other embodiments, the marketplace can be accessed through another device, such as the user's personal computer.

As shown in the example in FIG. 4, the marketplace includes options for two plans 404, 406. Plan 404 is associated with Carrier 1, includes features 408 (e.g., unlimited talk, unlimited text, and unlimited data), and is associated with price 412. Plan 406 is associated with Carrier 2, includes features 410 (e.g., unlimited talk, unlimited text, and 1 GB (gigabyte) data), and is associated with price 414. A user can select one of plans 404, 406 by selecting one of the purchase links 416. As described, in some embodiments, two or more plans can be offered by the same carrier.

In some embodiments, the choices for which carriers and/or plans are available to be purchased at the marketplace may be based on the country of the user and/or client device that is accessing the marketplace. In some cases, the user browsing the marketplace may be asked to select a country (or a country is selected by default), and the available plans correspond to plans available in that country. For example, the location of the client device may be based on a GPS location of the client device.

Once the user selects a plan, a server provisions a carrier profile for access to the carrier network associated with the plan. The carrier profile is then delivered to the client device and stored on a multi-profile UICC included in the client device. The client device can then access the services of the carrier network using the carrier profile.

Figure 5:
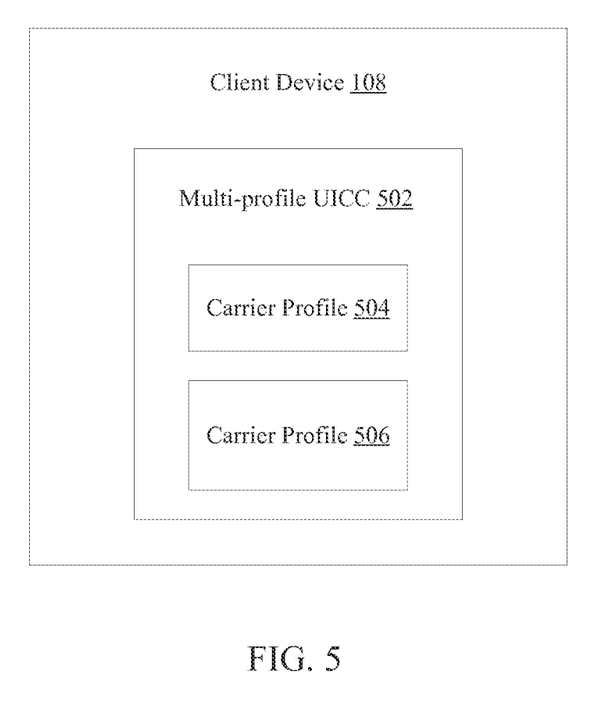
FIG. 5 is a conceptual diagram of a client device that includes a multi-profile SIM card, according to one embodiment of the disclosure.

FIG. 5 is a conceptual diagram of a client device 108 that includes a multi-profile UICC 502, according to one embodiment of the disclosure. As shown, multi-profile UICC 502 includes multiple carrier profiles 504, 506. Additional carrier profiles may also be included on the multi-profile UICC card 502. Each carrier profile provides the necessary information to allow the client device 108 to access a wireless carrier network associated with the carrier profile.

In some embodiments, the multi-profile UICC 502 is physical SIM card that is inserted into the client device 108. A SIM card can come in various dimensions. Traditionally, SIM cards are considered a Full-size SIM, a Mini-SIM, a Micro-SIM or a Nano-SIM. The Full-size SIM is approximately 85.6 mm in height, 53.98 mm in width and 0.76 mm in depth. The Mini-SIM is approximately 25 mm in height, 15 mm in width and 0.76 mm in depth. The Micro-SIM is approximately 15 mm in height, 12 mm in width and 0.76 mm in depth. The Nano-SIM is approximately 12.3 mm in height, 8.8 mm in width and 0.67 mm in depth.

In certain embodiments of the disclosure, the multi-profile UICC 502 is not designed to be inserted into mobile device 102. Rather, the mobile device 108 includes the dedicated memory configured to store a data representation of the multi-profile UICC 502 and the carrier profiles included therein. The dedicated memory may be a separate memory device integrated into the electrical architectural design of the mobile device 108 or may be a dedicated portion of memory 204 or a dedicated portion of storage device 208, as shown in FIG. 2. The dedicated memory is configured to store the carrier profiles 504, 506 on the multi-profile UICC 502. As the carrier profile data is secure data required for a mobile device 108 to access a subscriber network, the carrier profile data should be stored in a location within the mobile device 108 that will not be corrupted by other programs or applications operating on the mobile device 108. The dedicated memory provides such a secure location for the mobile device 108 to store the carrier profile data such that the carrier profile data can be accessed when necessary in order to provide the client device 108 with access credentials to the carrier network. In this regard, the dedicated memory is a secured dedicated memory.

As an aside, beyond having the carrier profile data stored in a secure location, the carrier profile data may be encrypted prior to storage. In this regard, an unauthorized user of the mobile device 108 will not be able to read the encrypted carrier profile data from the dedicated memory.

As described in greater detail herein, in some embodiments, the carrier profiles 504, 506 may be downloaded from a server configured to provision the carrier profiles. In other embodiments, the carrier profiles 504, 506 may be permanently stored on the SIM card 502, but can be deactivated. The deactivated carrier profiles can be activated by the server, e.g., after a user pays for and subscribes for a plan associated with the wireless network and the carrier profile.

Figure 6:
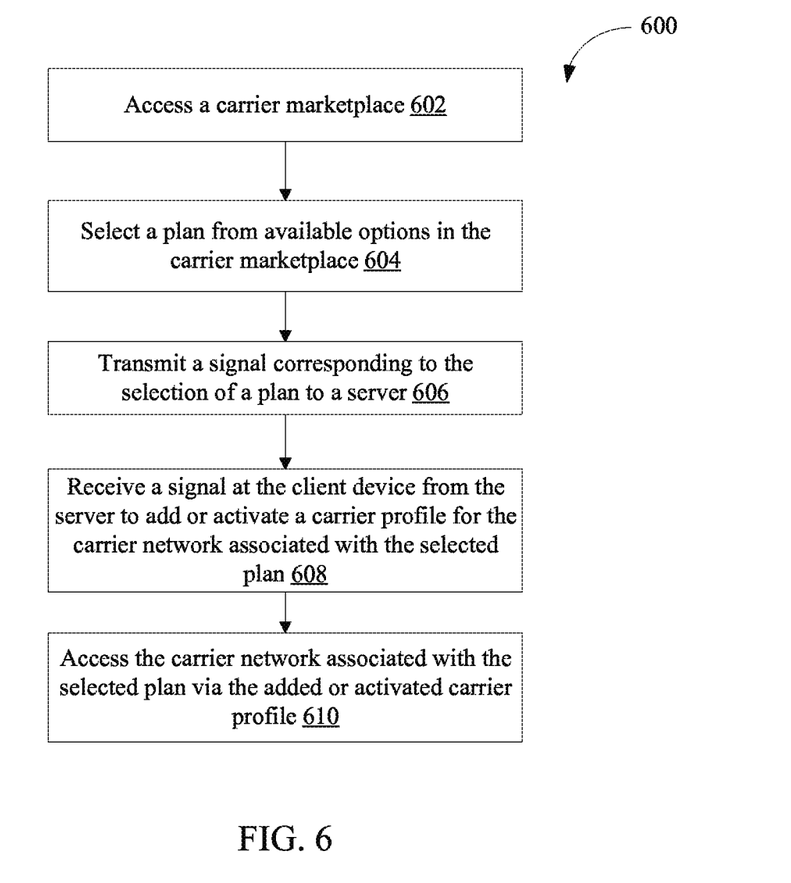
FIG. 6 is a flow diagram of method steps performed by a client device for accessing a carrier network, according to one embodiment of the disclosure.

FIG. 6 is a flow diagram of method steps performed by a client device for accessing a carrier network, according to one embodiment of the disclosure. As shown, the method 600 begins at step 602, where a client device accesses a carrier marketplace. In one embodiment, the client device of FIG. 6 is the client device 108 in FIG. 1. As described, the carrier marketplace can be accessed online, over the phone, via email, etc. In another embodiment, another device other than the client device is used to access the carrier marketplace.

At step 604, the client device selects a plan from the available options in the carrier marketplace. As described, the available options may be based on country or location of the client device, e.g., a GPS location of the client device.

At step 606, the client device transmits a signal corresponding to the selection of a plan to a server. In some embodiments, the server may be server 106 shown in FIG. 1. The server is configured to provision a carrier profile for the client device to access the carrier network associated with selected plan.

At step 608, the client device receives a signal at the client device from the server to add or activate a carrier profile for the carrier network associated with the selected plan. The carrier profile can be set as the active carrier profile that will be used by the client device to access a corresponding carrier network.

At step 610, the client device accesses the carrier network associated with the selected plan via the added or activated carrier profile.

Figure 7:
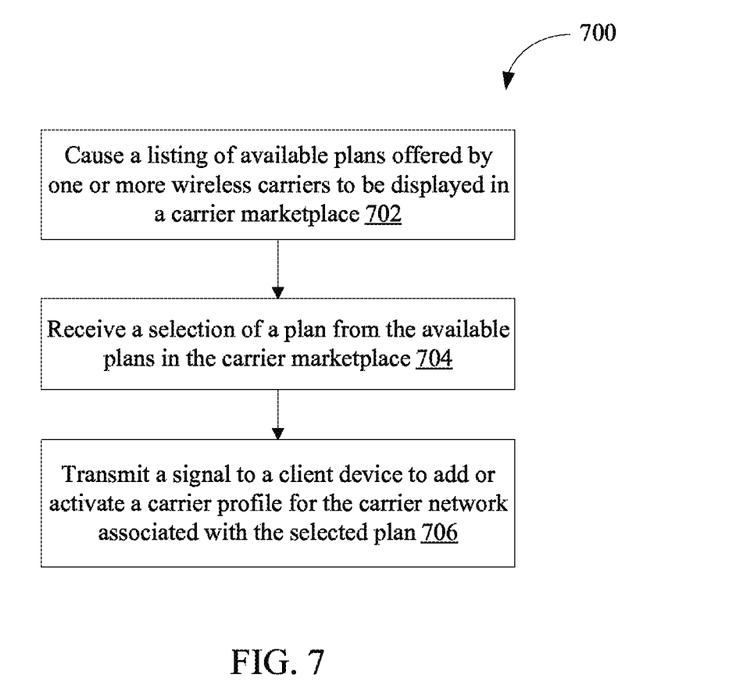
FIG. 7 is a flow diagram of method steps performed by a server or cluster of servers for providing access to a carrier network, according to one embodiment of the disclosure.

FIG. 7 is a flow diagram of method steps performed by a server or cluster of servers for providing access to a carrier network, according to one embodiment of the disclosure. As shown, the method 700 begins at step 702, where the server causes a listing of available plans offered by one or more wireless carriers to be displayed in a carrier marketplace.

At step 704, the server receives a selection of a plan from the available plans in the carrier marketplace. As described, the available plans may be based on country or location of a client device.

At step 706, the server transmits a signal to a client device to add or activate a carrier profile for the carrier network associated with the selected plan. In one embodiment, the client device may be the client device 108 in FIG. 1. The carrier profile can be set as the active carrier profile that will be used by the client device to access the carrier network associated with the selected plan. The client device then can begin accessing the carrier network associated with the selected plan via the added carrier profile.

In sum, embodiments of the disclosure provide a marketplace for carriers to sell plans on their respective networks. Users can access the marketplace to select a plan for purchase. A server then provisions a carrier profile for the carrier network associated with the plan. The carrier profile is stored onto a multi-profile UICC included in the mobile device. As described, the multi-profile UICC may not be physical, but rather may be a software construct made up of data stored in the client device that represents a carrier profile stored on a physical SIM card. Once the carrier profile is added to the multi-profile UICC and activated, the client device may begin accessing the carrier network via the added carrier profile.

Advantageously, embodiments of the disclosure improve access to different carrier networks on mobile devices. For example, international travelers gain the benefit of competition in the marketplace without any added trouble of purchasing and installing new SIM cards. In addition, embodiments of the disclosure can increase competition in the wireless marketplace.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the objectives of the disclosure. Variations of those preferred embodiments may become apparent to those of ordinary skill in the art upon reading the foregoing description. The inventors expect skilled artisans to employ such variations as appropriate, and the inventors intend for the disclosed embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method for accessing a carrier network by a client device, the method comprising:
   prior to selecting a carrier network to download a carrier profile to access the carrier network using the carrier profile, performing, by the client device, a network scan to directly determine available carrier networks that are visible and usable by the client device to access, the available carrier networks including a first carrier network that provides a first plan and a second carrier network that provides a second plan;
   after performing the network scan, receiving, by the client device, a selection of the first plan, the first plan being obtained from a server device that includes at least the first plan and the second plan, wherein the first plan corresponds to a first set of services provided by the first carrier network, and the second plan corresponds to a second set of services provided by the second carrier network;
   transmitting, by the client device, a signal to the server device requesting download of the carrier profile, the carrier profile being associated with the first plan;
   downloading, by the client device, the carrier profile from the server device to a multi-profile Universal Integrated Circuit Card (UICC) included in the client device;
   storing, by the client device, the carrier profile in the multi-profile UICC; and
   accessing, by the client device, a service included in the first set of services from the client device via the first carrier network based on the carrier profile downloaded from the server device and stored in the multi-profile UICC.

2. The method of claim 1, wherein the carrier profile is stored in a dedicated memory device configured for storing the carrier profile separately from other data stored locally at the client device.

3. The method of claim 1, wherein the first plan is associated with a first price and the second plan is associated with a second price.

4. The method of claim 1, wherein the first set of services includes an amount of talk time, a number of text messages, and an amount of data that can be accessed via the client device using the first carrier network during a first time period.

5. A non-transitory computer-readable storage medium storing instructions that, when executed by a processor, cause a client device to access a carrier network, by performing the steps of:
   prior to selecting a carrier network to download a carrier profile to access the carrier network using the carrier profile, performing a network scan to directly determine available carrier networks that are visible and usable by the client device to access, the available carrier networks including a first carrier network that provides a first plan and a second carrier network that provides a second plan;
   after performing the network scan, receiving a selection of the first plan, the first plan being obtained from a server device that includes at least the first plan and the second plan, wherein the first plan corresponds to a first set of services provided by the first carrier network and the second plan corresponds to a second set of services provided by the second carrier network;
   transmitting a signal to the server device requesting download of the carrier profile, the carrier profile being associated with the first plan;
   downloading the carrier profile from the server device to a multi-profile Universal Integrated Circuit Card (UICC) included in the client device;
   storing the carrier profile in the multi-profile UICC; and
   accessing a service included in the first set of services from the client device via the first carrier network based on the carrier profile downloaded from the server device and stored in the multi-profile UICC.

6. The non-transitory computer-readable storage medium of claim 5, wherein the carrier profile is stored in a dedicated memory device configured for storing the carrier profile separately from other data stored locally at the client device.

7. The non-transitory computer-readable storage medium of claim 5, wherein the first plan is associated with a first price and the second plan is associated with a second price.

8. The non-transitory computer-readable storage medium of claim 5, wherein the first set of services includes an amount of talk time, a number of text messages, and an amount of data that can be accessed via the client device using a first carrier network during a first time period.

9. The non-transitory computer-readable storage medium of claim 5, wherein the first set of services and the second set of services are both provided by the first carrier network.

10. A system for accessing a carrier network, the system comprising:
a client device; and
a server device configured to:
cause a listing of available carrier network plans to be displayed, wherein a first carrier network plan corresponds to a first set of services provided by a first carrier network, and a second carrier network plan corresponds to a second set of services provided by a second carrier network, wherein the listing of available carrier network plans to be displayed is based on the client device, prior to selecting a carrier network to download a carrier profile to access the carrier network using the carrier profile, performing a network scan to directly determine available carrier networks that are visible and usable by the client device to access,
receive a request from the client device to download the carrier profile, the carrier profile being associated with a selection of the first carrier network plan,
provision the carrier profile associated with the selection of the first carrier network plan for the client device, and
transmit a signal to the client device to download the carrier profile to a multi-profile Universal Integrated Circuit Card (UICC) included in the client device to allow the client device to access a service included in the first set of services via the first carrier network associated with the first set of services based on the downloaded carrier profile.

11. The method of claim 1, wherein the first set of services is different from the second set of services.

12. The non-transitory computer-readable storage medium of claim 5, wherein the first set of services is different from the second set of services.

13. The method of claim 1, wherein the first plan and the second plan included in the server device are based on location data collected by the client device to determine available carrier networks including the first carrier network that provides the first plan and the second carrier network that provides the second plan.

14. The non-transitory computer-readable storage medium of claim 5, wherein the first plan and the second plan included in the server device are based on location data collected by the client device to determine available carrier networks including the first carrier network that provides the first plan and the second carrier network that provides the second plan.

15. The system of claim 10, wherein the signal to the client device includes an email to an account associated with a user of the client device that provides a link to download the carrier profile.

16. The system of claim 10, wherein the signal to the client device includes data specifying the carrier profile that the client device directly downloads.

17. The system of claim 10, wherein the listing of available carrier network plans to be displayed is based on a location of the client device.

18. The method of claim 1, wherein downloading the carrier profile from the server device to the multi-profile UICC included in the client device is in response to receiving another signal from the server device that includes an email to an account associated with a user of the client device that provides a link to download the carrier profile.

19. The non-transitory computer-readable storage medium of claim 5, wherein downloading the carrier profile from the server device to the multi-profile UICC included in the client device is in response to receiving another signal from the server device that includes an email to an account associated with a user of the client device that provides a link to download the carrier profile.

20. The method of claim 1, wherein the carrier profile is a Subscriber Identity Module (SIM) profile.

* * * * *